Figure 1:
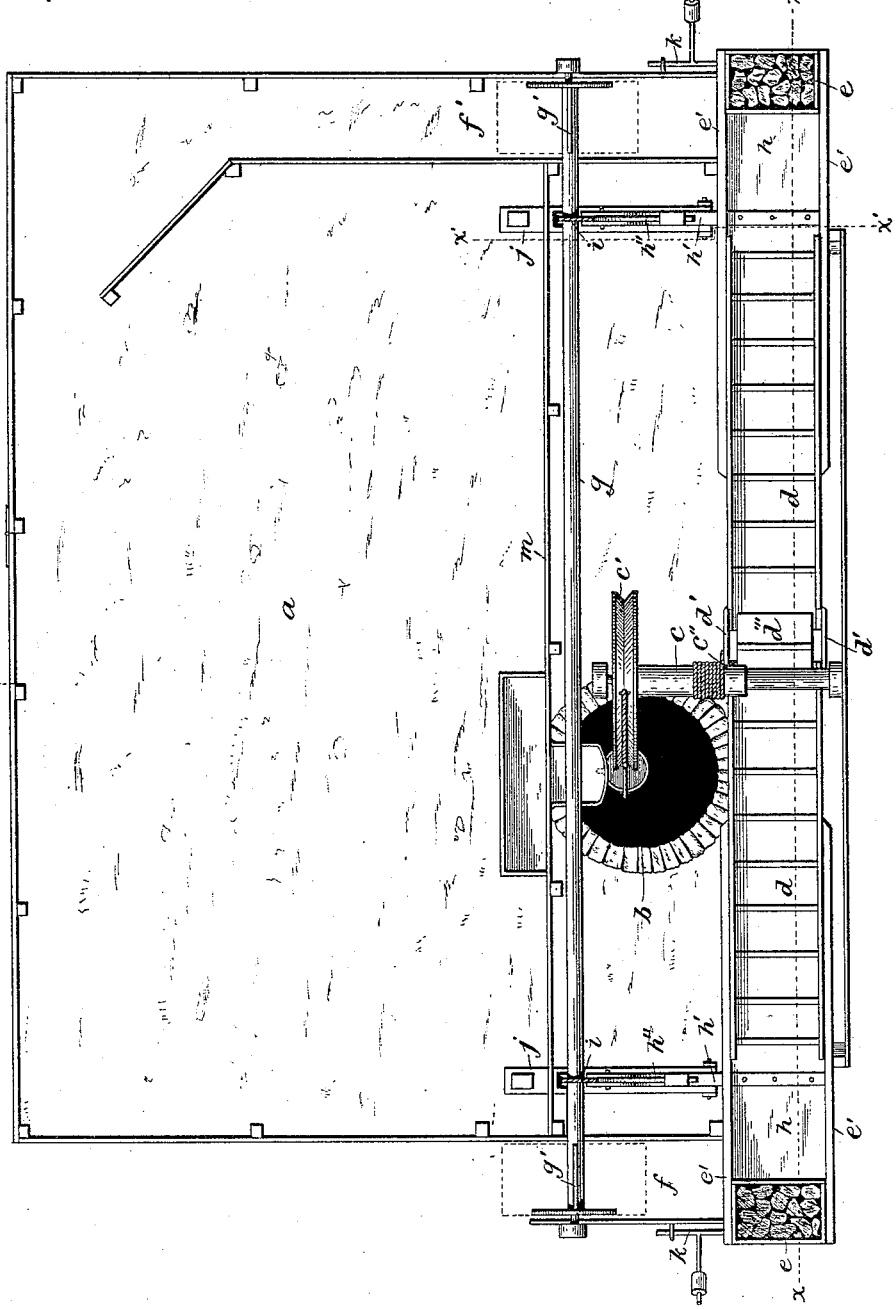

(No Model.) 2 Sheets—Sheet 1.

G. W. CAMPBELL.
WATER ELEVATOR.

No. 424,920. Patented Apr. 1, 1890.

WITNESSES:
Edwin L. Bradford
C. D. Davis

INVENTOR
Geo. W. Campbell
BY C. M. Alexander
ATTORNEY.

(No Model.) 2 Sheets—Sheet 2.
G. W. CAMPBELL.
WATER ELEVATOR.
No. 424,920. Patented Apr. 1, 1890.
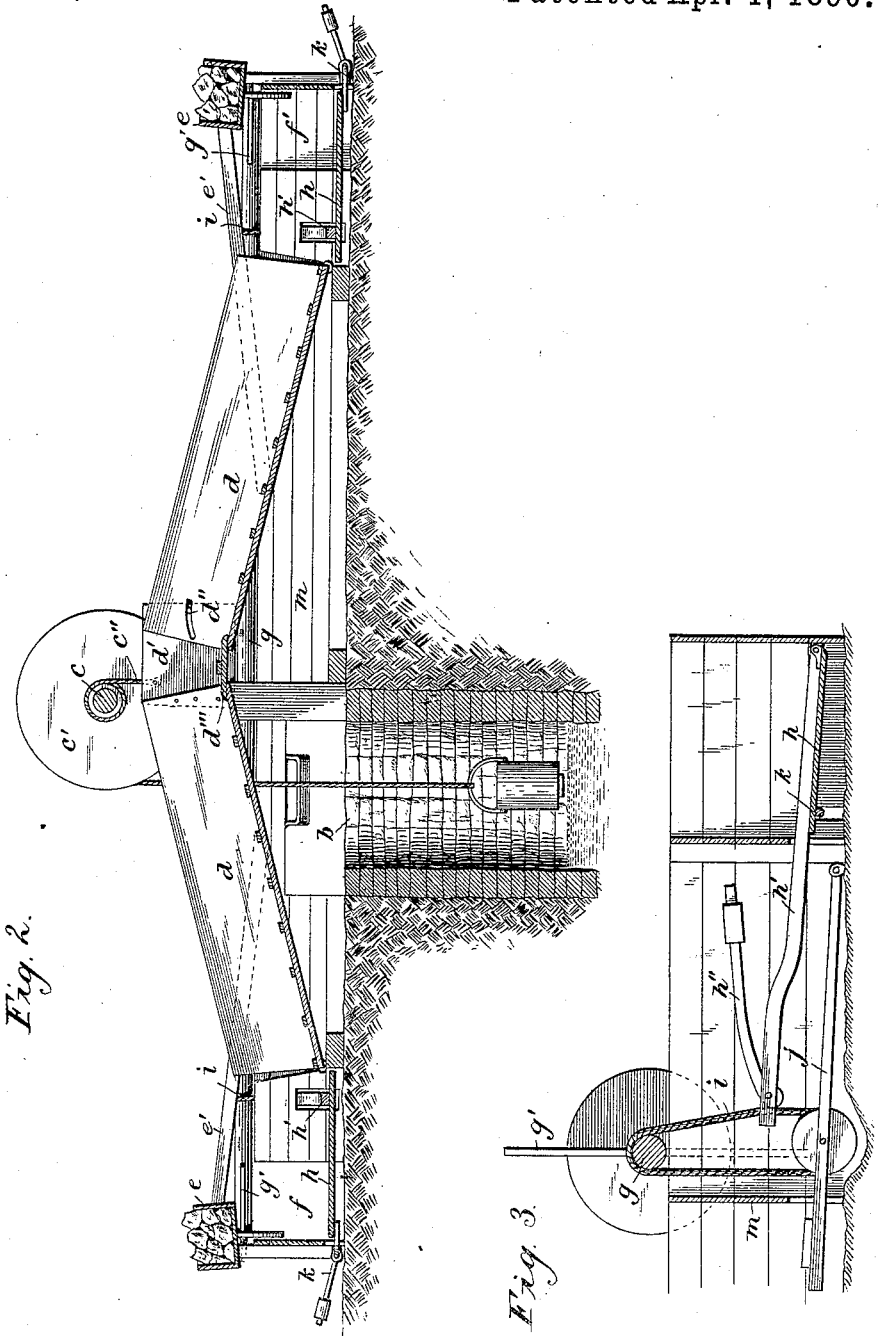
WITNESSES:
Edwin L Bradford
INVENTOR
Geo. W. Campbell
BY C. M. Alexander
ATTORNEY.

UNITED STATES PATENT OFFICE.

GEORGE W. CAMPBELL, OF EL PASO, ASSIGNOR OF ONE-FOURTH TO JOHN H. BABB, OF PUTNAM, TEXAS.

WATER-ELEVATOR.

SPECIFICATION forming part of Letters Patent No. 424,920, dated April 1, 1890.

Application filed January 4, 1890. Serial No. 335,877. (No model.)

*To all whom it may concern:*

Be it known that I, GEORGE W. CAMPBELL, a citizen of the United States, residing at El Paso, in the county of El Paso and State of Texas, have invented certain new and useful Improvements in Water-Elevators, of which the following is a specification, reference being had therein to the accompanying drawings, in which—

Figure 1 represents a plan view of my improved water-elevating apparatus; Fig. 2, a longitudinal sectional view taken on the line $x$ $x$ of Fig. 1; Fig. 3, a transverse sectional view on the line $x'$ $x'$ of Fig. 1.

The invention has for its object the provision of an apparatus for use in connection with a well, whereby the well-bucket will be automatically elevated and emptied into a trough by the weight of the cattle that may come to the well to drink, the apparatus being particularly designed for use in the western countries, where large numbers of cattle come to each well in herds, as will fully hereinafter appear.

In the drawings annexed, $a$ designates a pen or inclosure of any suitable dimensions and surrounding a well $b$, over which is journaled on suitable posts a horizontal windlass or shaft $c$, provided with a large drum or sheave $c'$, around which the well-rope is wound. The well-bucket may be provided with a valve in its bottom and means for automatically emptying it into an adjacent trough; but as any suitable means may be employed for this purpose, I will not describe them further in this application.

Arranged at right angles to and under the shaft $c$ are two inclined chutes $d$ $d$, the outer lower ends of which are pivoted to beams set in or upon the ground. The adjacent or upper ends of these inclined chutes are adjustably connected together by side plates $d'$, secured on opposite sides of the chutes and provided with curved slots and pins $d''$, which latter serve to keep them in alignment with each other and at the same time allow the adjacent ends of the chutes to be depressed in unison. A plate or board $d'''$ is pivoted to the bottom of one chute and allowed to rest upon the floor of the adjacent chute, in order that the passing cattle cannot step in the space between the ends of the chutes. The adjacent ends of the chutes are connected to the shaft $c$ immediately above by a rope $c''$, which is wound around the same in an opposite direction to the rope around the drum $c'$, as shown. The connected ends of the chutes are held normally up by means of weight-boxes $e$, connected to the respective outer ends of the chutes by outwardly and upwardly inclined arms $e'$, the boxes being filled with a suitable quantity of stones, gravel, or other heavy substances. As thus arranged, it will be observed that when an animal walks across the chutes the upper ends of the same will be depressed by the weight of the animal, causing the rotation of the drum and shaft, whereby the well-bucket (which may be of any suitable capacity) is automatically elevated and emptied into an adjacent trough. When the animal has passed over the chutes, the weighted boxes will cause all the parts to assume their normal positions, the bucket falling back into the well and filling automatically ready for another operation.

I will now describe the mechanism I employ for admitting one animal at a time to the main inclosure $a$ and directing them across the inclined chutes. It will be observed that the inclined chutes are entirely within the main inclosure and that their lower ends terminate near the sides of the inclosure. Leading into the lower end of the left-hand chute is an alley-way or passage-way $f$, through which the cattle must pass in order to cross the chutes and get into the inclosure, and leading out of the lower end of the other chute is another passage-way $f'$, which leads into the main inclosure. Journaled in posts erected at opposite sides of the inclosure is a long rock-shaft $g$, provided with gates $g'$ on its ends, these gates being adapted to alternately open and close the entrances to the passages $f f'$. When these gates are in a horizontal position, the passages $f f'$ are open for the passage of an animal. These gates are kept open all the time.

Pivoted on the floor of each of the passage-ways $f f'$ is a normally-held-up platform $h$, provided with an arm $h'$, which extends into the inclosure to a point almost directly under the rock-shaft. The ends of these arms are provided with weighted cam-levers $h''$, adapted to automatically grip endless bands or chains $i$, depending from the rock-shaft, the bands passing through apertures in the forward ends of the said arms. The bands are kept taut by means of weighted levers or bars $j$, pivoted upon the ground, and having journaled in their outer ends grooved pulleys, over which the endless bands pass. Weighted pivoted levers $k$ are provided to keep the platforms normally up at their free edges.

It will be observed that when an animal treads upon one of the platforms $h$ the arm $h'$ will be depressed and drawn down with it one side or portion of the endless band, whereby the rock-shaft will be revolved one-fourth of a revolution to close the passage-ways $f\,f'$, with its gates, and when the animal steps off the platform the same will automatically (by means of the pivoted weighted lever $k$) assume its normal position without revolving the rock-shaft, the cam-lever automatically releasing the endless band as its arm $h'$ moves upward.

A division-fence $m$ may be erected across the main inclosure, if desired, to keep the cattle away from the working parts of the apparatus and the well, and the inclosure $a$ may be provided with a gate, if desired, to let the cattle pass out of the inclosure.

When an animal passes in under the entrance-gate to passage-way $f$, he treads upon the platform $h$ and thereby, in the manner hereinbefore described, revolves the rock-shaft a quarter-turn and immediately closes the entrance-gate, and as he passes over the double inclined chutes the well-bucket is automatically raised and dumped into any suitable trough in any of the usual ways. As the animal passes out of the inclined chutes, he will tread upon the other platform $h$ in passage-way $f'$, and thereby again rotate the rock-shaft a sufficient distance to open both passage-ways $f$ and $f'$, permitting himself to pass into the main inclosure where the trough is located and opening the entrance-gate for the passage of another animal. The operation is kept up in this way, one animal at a time entering the main inclosure and being compelled to elevate his own drinking-water until the entire herd has entered and "watered."

The animals may be released through a suitable gate in the inclosing-fence, or they may be compelled to pass back over the chutes, and thereby go through the operation of elevating the water over again. This latter method is preferable, inasmuch as a sufficient quantity of water will be thereby elevated to supply the younger animals, which are too small to operate the elevating apparatus.

This invention is designed to take the place of the windmill now used for this purpose, inasmuch as the windmill system has been found inadequate in a number of respects.

Having thus described my invention, what I claim is—

1. The combination, with a main inclosure surrounding a well, of inclined pivoted chutes connected together and normally held up at their adjacent ends, an overhead shaft carrying a sheave and connected to the upper ends of the chutes, a rope connecting the sheaves to the well-bucket, a passage-way $f$, leading into the lower end of one of the chutes, a passage-way leading from the lower end of the other chute into the main inclosure, gates in the passage-ways $f\,f'$, and means for simultaneously opening and closing said gates, whereby but one animal at a time shall be allowed to pass over the chutes into the inclosure, substantially as described.

2. The combination of the inclosure $a$, the inclined chutes connected to the well-windlass, passages $f\,f'$, leading into the chutes, a rock-shaft provided with gates to simultaneously open and close the said passages $f\,f'$, pivoted platforms in these passages, and means for rotating the rock-shaft by means of these pivoted platforms, substantially as described.

In testimony whereof I affix my signature in presence of two witnesses.

GEORGE W. CAMPBELL.

Witnesses:
J. R. KRATER,
R. P. PANKEY.